May 24, 1960
S. A. HIRSH
2,938,166
DIRECT READING FREQUENCY METER
Filed Feb. 15, 1957
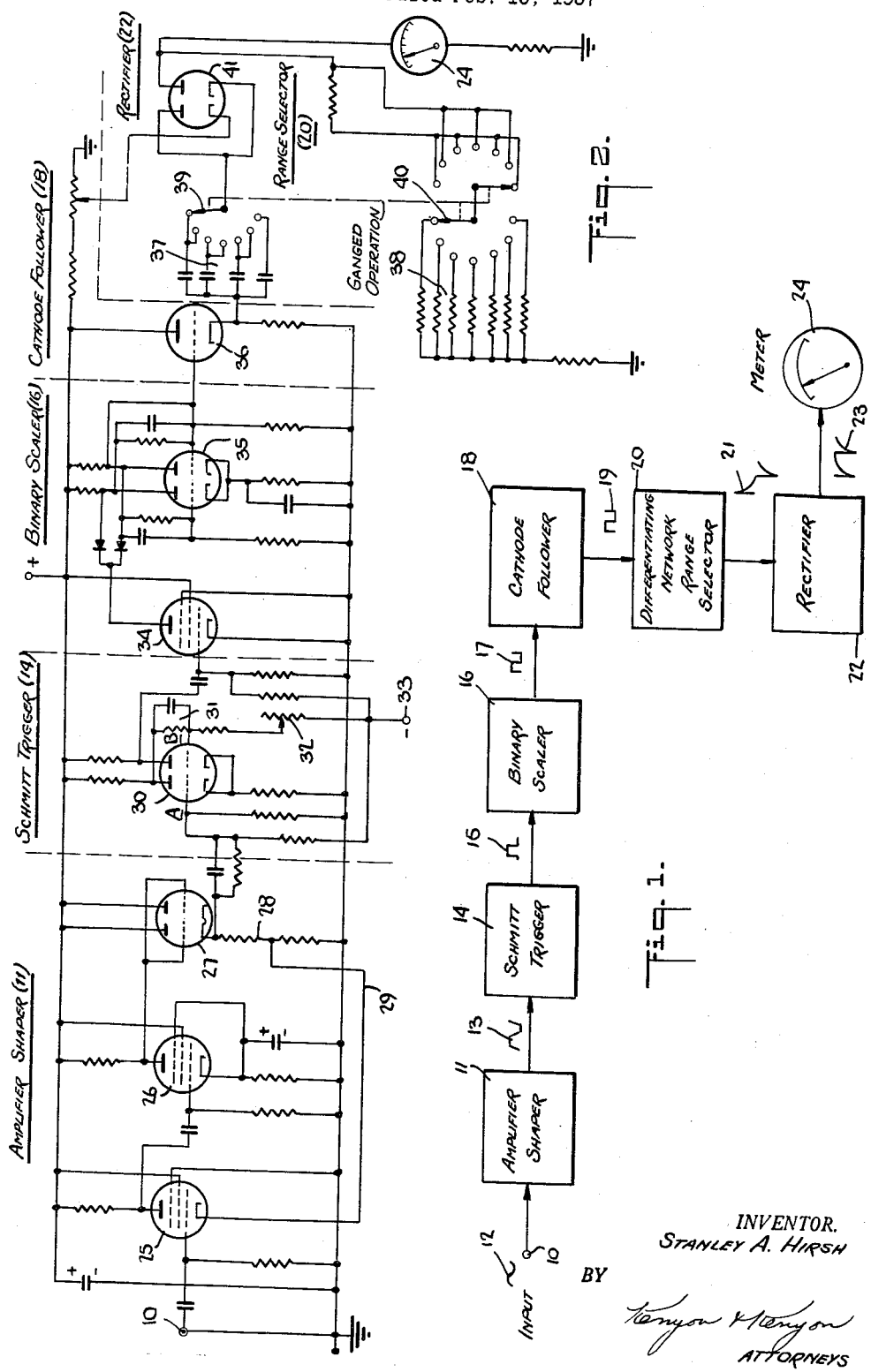
INVENTOR.
STANLEY A. HIRSH
BY
Kenyon & Kenyon
ATTORNEYS

United States Patent Office 2,938,166
Patented May 24, 1960

2,938,166
DIRECT READING FREQUENCY METER

Stanley A. Hirsh, Valley Stream, N.Y., assignor to Bulova Research and Development Laboratories, Inc., Woodside, N.Y., a corporation of New York Filed Feb. 15, 1957, Ser. No. 640,361

2 Claims. (Cl. 324—78)

The present invention relates generally to electrical frequency measuring techniques, and more particularly to apparatus for directly reading the frequency of a periodic voltage wave and adapted to provide an accurate indication irrespective of the shape or amplitude of the applied wave.

Periodic voltages may be constituted by sinusoidal or pulsatory wave, the frequency or repetition rate being measured by counting the number of wave recurrences in a standard unit of time. Pulses are distinguished from sinusoidal and steady waves by rapid changes in amplitude, a large ratio of peak to average value, a small duty cycle and a wide frequency spectrum. While it has heretofore been possible to read the frequency of a sinusoidal alternating voltage accurately on frequency meters, such meters are not reliable when the input thereto is in pulsating form.

One prior art method of measuring the frequency of a sinusoidal voltage involves amplifying the voltage repeatedly and clipping it so as to produce a pulse having approximately a square wave shape. This square wave pulse is then differentiated, rectified and applied to a direct current meter affording a visual indication of frequency, the average current through the meter being proportional to the pulse repetition rate.

When the input voltage applied to a frequency meter of the above-described type is of a low duty cycle, considerable error is introduced, for the meter is usually calibrated for a sinusoidal voltage. This is true because the current flow through the meter is a function of the duty cycle of the applied wave form. Another serious disadvantage of this method is that if the input voltage falls below the level required to swing the amplifiers from saturation to cut-off, the meter reading becomes a function of the input voltage amplitude rather than of frequency. Thus should the operator be unaware of the fact that the input voltage is below the required level, an incorrect reading would result.

Another known system for frequency measurement makes use of a Schmitt trigger in conjunction with a Phantastron circuit to turn a constant current generator on at the beginning of each cycle and to turn it off at some point in the cycle fixed by the time constant of the Phantastron. The resulting pulses of current are averaged in time by a meter which presents a visual indication of the input voltage frequency. While this system is an improvement over the one previously described, it nevertheless has certain inherent drawbacks. If the time constant of the Phantastron is longer than the period of the input voltage, the meter indication is in error. This occurs because the Phantastron is oblivious to any number of pulses which may occur during the time it is on. Since the time constant of the Phantastron is pre-determined by the setting on the range switch on this type of meter, the meter indication bears no relationship to the frequency of the input voltage if the frequency of the input voltage exceeds that indicated on the range switch. It is evident therefore that the Phantastron type of frequency meters requires some prior knowledge of the very information being sought.

In view of the foregoing, it is the principal object of the invention to provide a frequency meter which gives the true frequency of an input voltage. A meter in accordance with the invention is within certain limits independent of the level of the applied voltage and is capable of measuring frequencies in the supersonic range and above.

Also an object of the invention is to provide a frequency meter whose accuracy is not affected adversely by the wave form of the applied voltage and which will correctly indicate the repetition rate of a pulsatory wave, as well as the frequency of an applied sinusoidal voltage.

A further object of the invention is to provide a frequency meter which obviates the need to conjecture as to the approximate frequency of the applied voltage prior to making a measurement, and which makes use of a d'Arsonval meter which directly indicates the measurement. A feature of the invention resides in the fact that if the applied frequency is higher than that indicated on the range setting, the meter will read high and off scale, until the proper range setting is made. The instrument will give no indication at all if the voltage lies below a predetermined amplitude and will afford an accurate reading if it is above, up to very large limits.

Also an object of the invention is to provide a frequency meter of simple, efficient and reliable design.

For a better understanding of the invention as well as other objects and further features thereof, reference is had to the following detailed description to be read in conjunction with the accompanying drawing, wherein like components in the various views are identified by like reference numerals.

In the drawing:

Fig. 1 is a block diagram of a preferred embodiment of a frequency meter in accordance with the invention, and Fig. 2 is a schematic diagram of the meter.

Referring now to the drawing, and more particularly to Fig. 1, the periodic voltage whose frequency or repetition rate is to be measured is applied to input terminal 10 connected to an amplifier-shaper circuit 11. It will be assumed for purposes of explanation, that the input voltage is sinusoidal in form as represented by form 12. The applied voltage is distorted in the amplifier-shaper so as to sharpen the leading edge thereof and thereby decrease its rise time, whereby the sinusoidal voltage is caused to assume the trapezoidal shape illustrated by form 13.

The output of amplifier shaper 11 is fed to the input of a Schmitt trigger circuit 14 where it is further sharpened and compared to a standard voltage. If the voltage of unknown frequency, subsequent to amplification in stage 11, has an amplitude exceeding the reference or threshold level of the Schmitt trigger 14, the trigger yields one rectangular output pulse, as represented by pulse 15, for each input cycle. Conversely, if the applied wave is lower in amplitude than the reference level of the Schmitt trigger, the circuit does not operate and the meter reads zero.

The pulses 15 emitted by the Schmitt trigger 14 are fed to a binary scalar 16, where they are converted into a square wave-shaped voltage, as represented by form 17, the voltage having a constant amplitude and a 50 percent duty cycle. Since the amplitude and duty cycle are the same at all frequencies, the square wave 17 thus obtained offers a source of pulses of the high order of repeatability needed for accurate measurement. While the frequency of the square wave 17 is exactly half that of the input signal, this is of no consequence for measurement purposes.

The output of the binary scalar 16 is fed to a cathode follower 18 which acts to isolate the binary scalar from the remainder of the circuit and which yields a square wave 19 identical with the input wave. The cathode follower 18 applies the square wave signal to a differentiating-network range selector 20 where an appropriate resistance-capacitance time constant for the proper range of frequencies is selected.

The differential pulses, represented by form 21, are transferred to a rectifier 22 which clips one side of the differential pulses to produce uni-polarity pulses of the type shown by form 23. The uni-polarity or unidirectional pulses 23 are then integrated by a direct current meter 24 to produce a reading which is linear as a function of frequency. The various stages of the system are preferably operated from a regulated voltage supply to ensure circuit stability.

Referring now to the schematic circuit diagram shown in Fig. 2, the amplifier shaper 11 to which the input voltage is applied at terminal 10 is constituted by first and second amplifier stages including pentode tubes 25 and 26. It will again be assumed that the input voltage is sinusoidal in form. The amplifier tubes 25 and 26 are overdriven to provide the necessary distortion for sharpening the leading edge of the applied voltage and for flattening the peaks. Thus the output of the amplifier in the case of a sinusoidal wave input is trapezoidal in form.

The second amplifier stage is followed by a third stage which is a cathode follower including a dual-triode 27 whose elements are connected in parallel, the output voltage being developed across the cathode resistor 28. To obtain an uniform frequency response over a broad range, a negative feedback path 29 is connected between a tap on the cathode resistor 28 and the cathode of the first tube 25.

The voltage from the amplifier-shaper 11 is applied to the input of Schmitt trigger 14 which includes a dual-triode 30 having sections A and B, the input voltage being applied to the grid of section A. The anode of section A is coupled through an R-C network 31 to the grid of section B, the latter being connected through a potentiometer 32 to a source of reference voltage which includes a full wave rectifier tube 33 and the usual filters. The Schmitt circuit produces a rectangular output pulse having a sharp leading edge in response to each input cycle when the latter exceeds the level of the reference voltage applied to the grid of section B. But if the input falls below this input, no output is generated by the Schmitt trigger.

The pulse produced in the output of the Schmitt trigger is applied to a binary scalar 16 comprising a drive tube 34 whose output is fed to a bi-stable trigger circuit including dual-triode tube 35. Thus the pulses generated in the Schmitt trigger are converted by the scalar into a square wave-shaped voltage having constant amplitude, uniform width and a 50% duty cycle, these characteristics of the scalar output being independent of the pulses from the Schmitt trigger.

The square wave output of scalar 16 is fed through the cathode follower including triode 36 to differential network 20 including a bank of condensers 37, a bank of resistors 38, a selective switch 39 for the condensers and a selective switch 40 for the resistors. By adjustment of the switches, an appropriate resistance-capacitance combination may be selected for the proper range of frequencies. The differentiating network acts to produce a pulse of one polarity at the leading edge of the input pulse and a pulse of reverse polarity at the trailing edge thereof.

The differentiated pulses are applied to a dual diode tube 41 arranged on a clamping rectifier which passes only pulses of one polarity. These unidirectional pulses are integrated by the direct current meter 24, thereby producing a meter indication which represents the average current of the applied pulses and is linear as a function of frequency.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

I claim:

1. A direct-reading frequency meter providing accurate reading regardless of whether the input voltage is sinusoidal or pulsating in form, said meter comprising an amplifier adapted to sharpen the leading edge of the input voltage, a Schmitt trigger circuit including an adjustable reference level voltage source and responsive to the output of said amplifier to produce an output pulse only when the input thereto exceeds the amplitude of said reference voltage; a binary scalar circuit coupled to said trigger to produce square wave pulses whose duration and amplitude are independent of said trigger circuit pulses, means to differentiate the output pulses from said scalar, means to rectify said differentiated pulses to produce unidirectional pulses, and direct-current meter means responsive to said rectified pulses to provide an indication depending on the average current of said output pulses.

2. A direct-reading frequency meter providing accurate reading regardless of whether the input voltage is sinusoidal or pulsating in form, said meter comprising a shaping amplifier adapted to sharpen the input voltage, a Schmitt trigger including a reference voltage source and responsive to the output of said amplifier to produce an output pulse only when the input thereto exceeds the amplitude of said reference voltage; means to adjust the value of said reference voltage, a binary scalar circuit coupled to said trigger to produce square wave pulses whose duration and amplitude are independent of said trigger output pulses, resistance-capacitance means to differentiate the output of said scalar, diode means to rectify said differentiated pulses to produce unidirectional pulses, and direct-current meter means responsive to the average current of said rectified pulses.

References Cited in the file of this patent

UNITED STATES PATENTS

| | | |
|---|---|---|
| 2,260,933 | Cooper | Oct. 23, 1941 |
| 2,352,082 | De Rosa | June 20, 1944 |
| 2,629,008 | Lynch et al. | Feb. 17, 1953 |